US012367896B1

(12) United States Patent
Xue et al.

(10) Patent No.: US 12,367,896 B1
(45) Date of Patent: Jul. 22, 2025

(54) MAGNETIC RECORDING HEAD WRITER HAVING AN AUXILIARY MAGNETOMOTIVE FORCE COIL

(71) Applicant: SEAGATE TECHNOLOGY LLC, Fremont, CA (US)

(72) Inventors: Jianhua Xue, Maple Grove, MN (US); Olle Gunnar Heinonen, Eden Prairie, MN (US); Michael A. Seigler, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/771,263

(22) Filed: Jul. 12, 2024

(51) Int. Cl.
G11B 5/33 (2006.01)
G11B 5/00 (2006.01)
G11B 5/012 (2006.01)
G11B 5/02 (2006.01)
G11B 5/17 (2006.01)
G11B 5/40 (2006.01)

(52) U.S. Cl.
CPC .............. *G11B 5/02* (2013.01); *G11B 5/012* (2013.01); *G11B 5/17* (2013.01); *G11B 5/40* (2013.01); *G11B 2005/0021* (2013.01)

(58) Field of Classification Search
CPC .............. G11B 5/6082; G11B 5/4866; G11B 2005/0021; G11B 5/3903; G11B 2009/0005; G11B 5/607; G11B 5/6094; G11B 22/14; G11B 33/1406; G11B 5/40; G11B 5/4853; G11B 33/1433; G11B 5/3945; G11B 2005/021; G11B 5/4886; G11B 5/314

USPC .......................................................... 360/59
See application file for complete search history.

(56) References Cited

U.S. PATENT DOCUMENTS

| | | | |
|---|---|---|---|
| 8,339,736 B2 * | 12/2012 | Gao | G11B 5/3123 360/123.06 |
| 9,147,427 B1 | 9/2015 | Lee | |
| 9,305,575 B2 | 4/2016 | Zhao | |
| 9,431,036 B2 | 8/2016 | Vavra | |
| 9,626,991 B2 | 4/2017 | Chen | |
| 9,852,752 B1 | 12/2017 | Chou | |
| 10,490,221 B1 | 11/2019 | Chen | |
| 10,811,034 B1 | 10/2020 | Wu | |
| 11,049,515 B1 | 6/2021 | Liu | |
| 11,341,990 B1 | 5/2022 | Liu | |
| 11,900,971 B1 | 2/2024 | Goncharov | |
| 2008/0316631 A1 | 12/2008 | Gao | |
| 2009/0262636 A1 | 10/2009 | Xue | |

* cited by examiner

*Primary Examiner* — Nabil Z Hindi
(74) *Attorney, Agent, or Firm* — Mueting Raasch Group (57) ABSTRACT

Described are magnetic recording heads that include auxiliary current wires that drive the write pole tip, augmenting the main coils that provide magnetomotive force to the write pole. The auxiliary wires are provided in close proximity to the write pole tip near the media-facing surface of the recording head, and are preferably in closer proximity to the write pole tip than are the main coils. In certain writer designs that include one or more heat sink structures positioned near or around the write pole tip, such as may be found in heat-assisted magnetic recording writer constructions, the auxiliary wire(s) may be accommodated near or around the heat sink structures, or the heat sink structures themselves can serve as the auxiliary wires.

20 Claims, 6 Drawing Sheets

MAGNETIC RECORDING HEAD WRITER HAVING AN AUXILIARY MAGNETOMOTIVE FORCE COIL

TECHNICAL FIELD

The disclosure relates to magnetic recording heads, and to writers included in magnetic recording heads.

SUMMARY

In accordance with certain aspects, the present disclosure describes a recording head for writing data on magnetic data storage media, where the recording head includes a writer having a write pole having a pole tip extending from a main part of the write pole toward a media-facing surface of the recording head and configured to write on the magnetic data storage media. The recording head has a main coil positioned and configured to deliver current-generated magneto-motive force primarily to the main part of the write pole, and further includes one or more auxiliary wires positioned and configured to deliver current-generated magneto-motive force primarily to the pole tip of the write pole.

In certain aspects, the main coil is powered by a first electrical current and the one or more auxiliary wires are powered by a second electrical current that is different from the first electrical current. The first electrical current and the second electrical current may be in-phase or mutually out of phase.

In certain aspects, the main coil is powered by a first electrical current and the one or more auxiliary wires are also powered by the first electrical current.

In certain aspects, the recording head includes a heat channel having a portion disposed near the pole tip to thereby conduct heat away from an area near the pole tip. The heat channel may be configured to function as one of the one or more auxiliary wires.

In certain aspects, the recording head is configured to move in a down-track direction relative to the magnetic data storage media, thereby defining a front and a back of the recording head and components of the recording head, and the heat channel is positioned at the back of the write pole, at the front of the write pole, or both.

In certain aspects, at least one of the one or more auxiliary wires is disposed adjacent to the portion of the heat channel disposed near the pole tip, the at least one of the one or more auxiliary wires being electrically isolated from the heat channel.

In certain aspects, a barrier layer is disposed between the heat channel and the write pole.

In certain aspects, an insulating layer is disposed between the pole tip and the one or more auxiliary wires.

In accordance with certain aspects, the present disclosure describes a heat-assisted magnetic recording hard disk drive that includes magnetic storage media, a recording head, a near field transducer, and a heat channel. The recording head includes a writer having a write pole that has a pole tip configured to write on the magnetic data storage media. The pole tip extends from a main part of the write pole toward a media-facing surface of the recording head. A main coil is positioned and configured to deliver current-generated magneto-motive force primarily to the main part of the write pole, and one or more auxiliary wires are positioned and configured to deliver current-generated magneto-motive force primarily to the pole tip of the write pole. The near field transducer is positioned proximate to the pole tip and configured to direct evanescent electromagnetic fields emanating from plasmon polaritons at the magnetic storage media. The heat channel is disposed proximate to the pole tip and the near field transducer, and is configured to conduct heat away from the pole tip and the near field transducer.

In certain aspects, the heat channel is configured to function as one of the one or more auxiliary wires. In certain aspects, the heat channel is disposed at a trailing edge of the pole tip and partially wraps the pole tip near the media-facing surface. In certain aspects, the heat channel is a heat sink disposed at a leading edge of the pole tip.

In certain aspects, a heat diffuser carries heat away from the heat sink. In certain aspects, the heat sink is configured to function as one of the one or more auxiliary wires, and electrical current is provided to the heat sink from connections on the heat diffuser.

In certain aspects, the main coil includes a single main coil located near a trailing edge of the write pole, and in certain aspects the single main coil is a single-turn coil.

In certain aspects, a write pole cap is disposed between the heat channel and the pole tip. The write pole cap may be an insulator material or a metallic material.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The present disclosure relates to magnetic recording, and more specifically to enhancing magnetic writer switching behavior at high areal densities by adding auxiliary current wires that drive the write pole tip. The same signal/current that is applied to the main coils driving the main part of the write pole may also be applied to the auxiliary wires (also referred to herein as auxiliary coils), or the applied signal/current provided to the auxiliary wires may be different (for example having a set phase difference between the two). Certain writer embodiments may have one, two, three, four, or more coils in addition to the auxiliary wire or wires. The auxiliary wires are provided in close proximity to the write pole tip near the media-facing surface (also referred to herein as the air-bearing surface) of the recording head, and are preferably in closer proximity to the write pole tip than are the main coils. In certain writer designs such as heat-assisted magnetic recording (HAMR) writer constructions that include one or more heat sink structures positioned near or around the write pole tip, the auxiliary wire(s) may be accommodated near or around the heat sink structures, or the heat sink structures themselves can serve as the auxiliary wires.

With increasing areal density in magnetic hard disk drives, the bit length becomes smaller and smaller as the bits per inch (BPI) increases with higher areal density. The shrinking bit length requires the magnetic writer to switch faster in order to write high-quality transitions between bits. In addition, shrinking bit length requires the magnetization in the writer to switch reversibly and predictably so that the written bit lengths are well defined and with minimum variations in the amplitude of the write field while providing large enough field magnitude to write high-quality transitions. These characteristics are particularly sought in the pole tip, which is the narrow part of the pole that extends nearest to the recording media.

Increasing areal density to 5 TB per disk and beyond requires magnetic writers that are fast (short rise time) and maintain a high magnetic field in the media at high linear bit densities. Current writer designs are too slow (long rise time) and lose too much field magnitude at high linear bit densities. In certain HAMR writer designs, the main coils may be more than one micrometer away from the air-bearing surface (ABS) of the writer, and therefore the main coils primarily deliver current-generated magneto-motive force (MMF) to the wide parts of the writer main pole and yoke. In these wider parts, magnetic flux is propagated to the pole tip primarily through domain wall motion, which limits the speed at which the magnetic pole tip can reverse its magnetization direction, and also limits the magnitude of field that the pole tip can deliver to the recording media.

In accordance with the present disclosure, by adding one or more auxiliary wires close to the pole tip near the ABS of the recording head, current flowing in the auxiliary wire(s) can provide MMF in direct proximity to the pole tip near the ABS. This helps in reducing the switching time of the pole tip magnetization and in making the switching behavior more repeatable and stable. The auxiliary wire(s) can be located near the back edge of the writer pole tip or near the front edge of the writer pole tip, or both. The auxiliary wire(s) may also be wrapped around the pole tip, such as in the case where an auxiliary wire is located near the back edge of the pole tip and made to wrap around three sides the pole tip for added MMF. The auxiliary wire(s) may extend to the ABS or be recessed from the ABS.

In HAMR embodiments, the auxiliary wire(s) may be the abutted heat channel that runs around the back edge of the pole in some HAMR writer designs. In another HAMR embodiment, a heat sink under the pole tip may be used as an extra wire. The abutted heat channel and heat sink found in some HAMR designs are not present in conventional perpendicular magnetic recording writers. The heat channels and heat sinks in HAMR recording heads helps protect the HAMR head components, such as the near field transducer (NFT), from thermal degradation or damage. An NFT is in essence a nanoscale "antenna" for directing evanescent fields from plasmon polaritons excited in the NFT at the media surface in HAMR recording heads, thereby locally heating the recording media to reduce its coercivity, which allows the applied magnetic field to more easily change the magnetization of the media. This can allow for the use of small grain media with a larger magnetic anisotropy at room temperature to thereby enhance thermal stability of the recorded bits, which is desirable for recording at increased areal densities.

Auxiliary wires for providing MMF to the pole tip in accordance with various embodiments of the present disclosure may be composed of any suitably conductive material, preferably highly-conductive material such as Au, Cu, Ru, Rh, or Ir. Such auxiliary wires may be in ohmic contact with the pole tip, either with or without a diffusion barrier disposed between the auxiliary wire(s) and the pole tip. Diffusion barriers are useful particularly when the auxiliary wire material has a propensity to diffuse into the pole tip, such as when the auxiliary wire material is Au. Diffusion barrier materials may include a thin layer of a refractory metal such as Ir that provides for good thermal conductivity and as a good diffusion barrier. In certain aspects, the auxiliary wire(s) may be electrically insulated from the pole tip using an insulating material such as aluminum oxide or silicon oxide, preferably provided as a thin layer between the auxiliary wire and the pole tip. In certain embodiments, the auxiliary wire(s) may have a layered construction, such as conductor-insulator-conductor to thereby maintain heat sinking capability while mitigating the amount of current shunting through the pole tip.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements. Likewise, the use of charts is meant to elucidate selected behaviors (whether physical, electrical, optical, chemical, etc.) without being bound to exactitude or to any theory.

Figure 1:
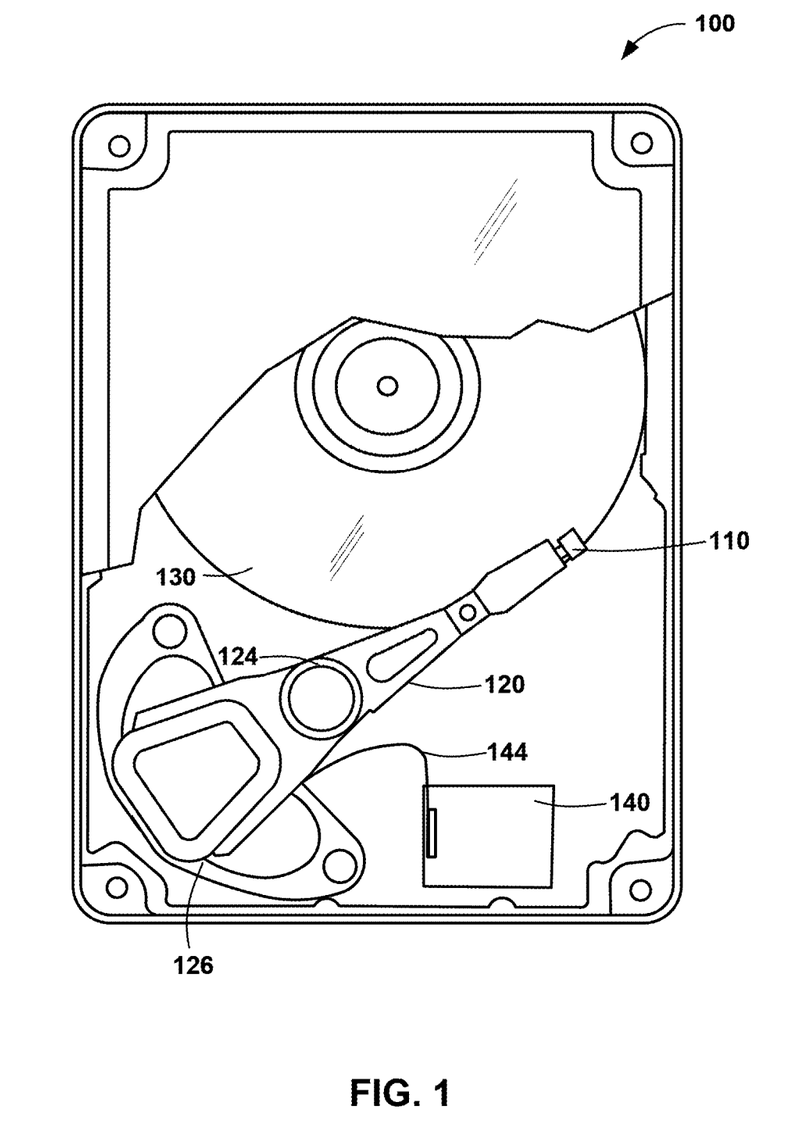
FIG. 1 is a schematic representation of an example hard disk drive that may incorporate recording heads in accordance with various aspects of the present disclosure.

FIG. 1 schematically depicts an example hard disk drive (HDD) device 100 that includes a recording head 110 having read and write capabilities. Recording head 110 is disposed on the end of an actuator arm 120 that is rotationally movable around a pivot 124 by use of a voice coil motor 126. The recording head 110 is positioned in close proximity to the surface of magnetic media disk 130 such that the recording head can write data to and read data from tracks on the magnetic media 130 as it spins by action of a spindle motor (not indicated). Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be communicatively coupled to spindle motor 135, and thereby control the spinning of the media disk(s) 130 along with the movement of the actuator 120 and the reading and writing of data via recording head 110. The internal components of conventional HDD 100 are contained within an enclosure 102, including cover 104, which is shown partially cut away to reveal the internal components. A host device can communicate with conventional HDD 100 through a standardized interface (not shown). HDD 100 can operate on any magnetic recording principle, whether that be conventional magnetic recording (CMR), shingled magnetic recording (SMR), heat-assisted magnetic recording (HAMR), or any other type of recording technique, including combinations thereof. Recording head 110 may be provided in accordance with one or more aspects of the present disclosure.

Figure 2:
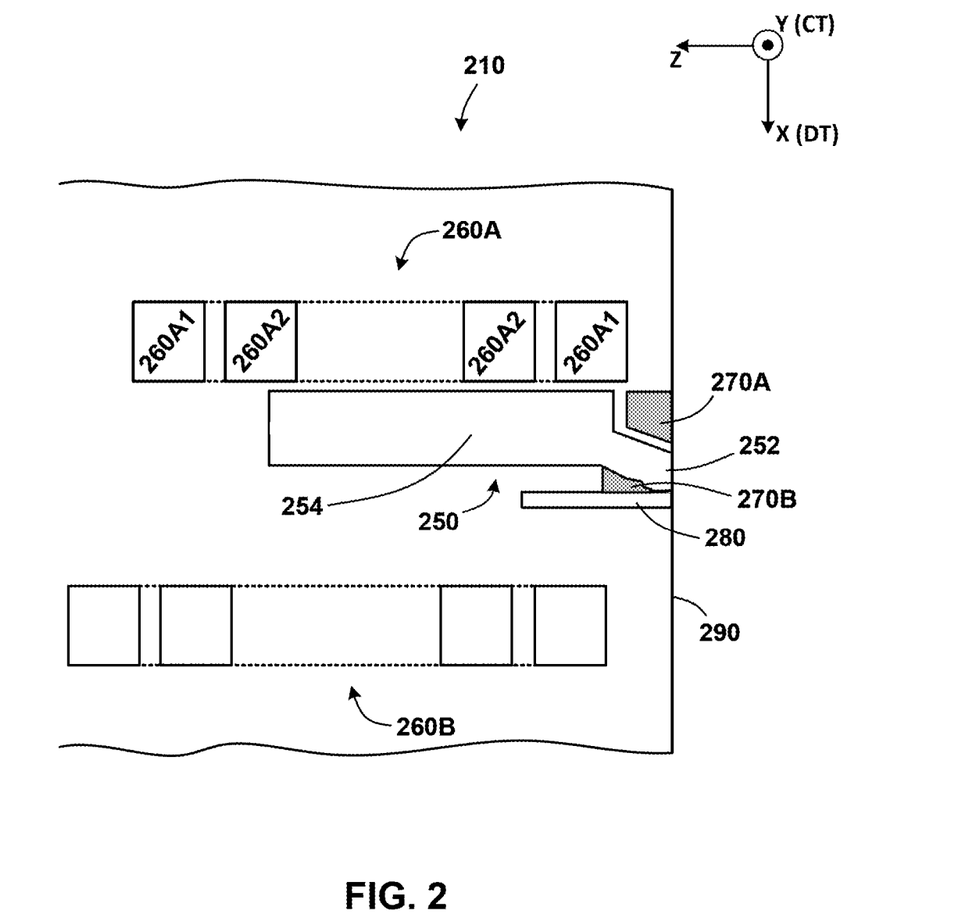
FIG. 2 is a schematic cross-section of a portion of a recording head in accordance with aspects of the present disclosure.

FIG. 2 shows a schematic cross section of certain writer components of a portion of a recording head 210. A magnetic write pole 250 is shown that includes wider main part 254 and a narrower pole tip 252 that extends from the main part 254 to a media-facing surface 290 (also called an ABS) of the recording head 210. As indicated by the axes in the upper right, the X-axis is aligned with the down-track (DT) direction running up and down the page. The DT direction is the direction of movement of the recording head 210 relative to the media surface (not shown), and thus by convention the portion of the recording head 210 at the bottom of FIG. 2 constitutes the front or leading edge, and the portion of the recording head 210 at the top of FIG. 2 constitutes the back or trailing edge. As such, the Y-axis, which is in and out of the page, aligns with the cross-track (CT) direction, and the Z-axis, which is left and right along the page, runs toward and away from the media surface.

In HAMR writer constructions, recording head 210 also includes a near field transducer (NFT) 280, typically located near the leading edge of the pole tip 252 and extending near or to the media-facing surface 290. As is well-known in the art, NFT 280 may include components such as a waveguide, plasmonic disk(s), a plasmonic peg, and other layers or components for generating or directing plasmons, for providing or directing electromagnetic radiation, and for providing other properties such as thermal stability. HAMR writer constructions may also include one or more heat channels or heat sinks that function to conduct heat away from the write pole 250, the write pole tip 252, and the NFT 280. For example, FIG. 2 shows a heat channel 270A disposed behind the write pole tip near the media-facing surface. Heat channel 270A may be referred to as an abutted heat channel. Heat channel 270A may be in contact with one or more surfaces the write pole 250 or there may be a diffusion layer, an insulating layer, and/or other layers disposed between the heat channel 270A and the write pole 250. An auxiliary wire providing current-driven MMF to the write pole tip 252 may also be provided between heat channel 270A and write pole 250 and/or may be routed around the periphery of heat channel 270A. In certain embodiments, heat channel 270A itself serves as an auxiliary wire providing current-driven MMF to the write pole tip 252. FIG. 2 also shows a heat sink 270B disposed in front of write pole tip 252. Heat sink 270B may be in contact with one or more surfaces the write pole 250 or there may be a diffusion layer, an insulating layer, and/or other layers disposed between the heat sink 270B and the write pole 250. An auxiliary wire providing current-driven MMF to the write pole tip 252 may also be provided between heat sink 270B and write pole 250 and/or may be routed around the periphery of heat sink 270B. In certain embodiments, heat sink 270B itself serves as an auxiliary wire providing current-driven MMF to the write pole tip 252.

Heat channel 270A and heat sink 270B, if present in a particular writer construction, may be used together in the same writer design or may be used one without the other. Heat channel 270A and heat sink 270B are generally made of materials that are good heat conductors, such as gold (Au). Because Au may diffuse easily in the materials of the magnetic write pole 250, a barrier layer made of Ir, Rh, or any other suitable material that serves as a diffusion barrier to Au, can be used between the heat channel or heat sink and the write pole. Silicon oxides, aluminum oxides, or other electrically insulating materials can also be used, in place of or in addition to the barrier layer, to electrically isolate the heat channel or heat sink from the write pole (and/or to provide a diffusion barrier). An insulating layer may be preferred when the heat channel or heat sink are used as auxiliary wires in accordance with the present disclosure.

Recording head 210 is shown to include main coils 260A and 260B that deliver MMF to the write pole 250. The main coils 260A and 260B are shown as two-turn coils, although single-turn coils or other suitable configurations may be used. In certain embodiments, the same current source used to power the main coils may be used to power the auxiliary wires or coils, or different current sources may be used to power the main coils versus the auxiliary wires or coils. Main coil 260A, which is behind the main part 254 of write pole 250, forms a disk-like torus shape in the y-z plane, and so the cross-sectional view shown in FIG. 2 shows the cross-section of a first coil turn 260A1 and a second coil turn 260A2. Main coil 260B, which is located in front of the write pole 250, is similarly oriented, although it is typically a farther distance away from the write pole 250 than main coil 260A to accommodate other components in the recording head 210 such as NFT 280. In certain embodiments, main coil 260B may be eliminated, for example when its contribution of MMF to the write pole 250 is negligible, for example due to the additional MMF provided to the pole tip 252 from auxiliary coils or wires in accordance with the present disclosure. As such, it is within the scope of the present disclosure to include a single MMF coil, to include single-turn main MMF coils, or to include a single single-turn MMF coil, thereby reducing the amount of space taken up by MMF coils in the recording head. In accordance with the present disclosure, the inclusion of auxiliary wires or coils near the pole tip to deliver MMF can allow for reducing the size or number of main MMF coils.

Figure 3A:
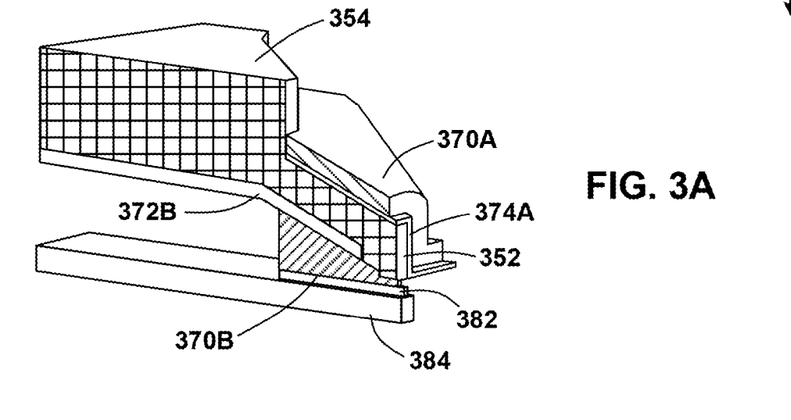
FIGS. 3A-C are schematic cross-section perspective views of components of a recording head in accordance with aspects of the present disclosure.
Figure 3B:
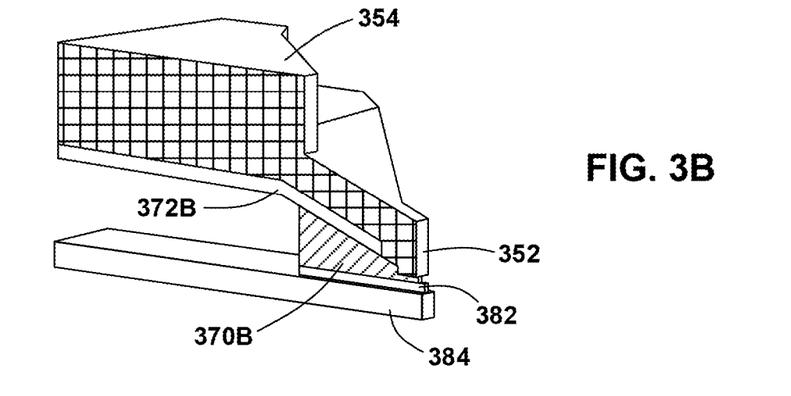
Figure 3C:
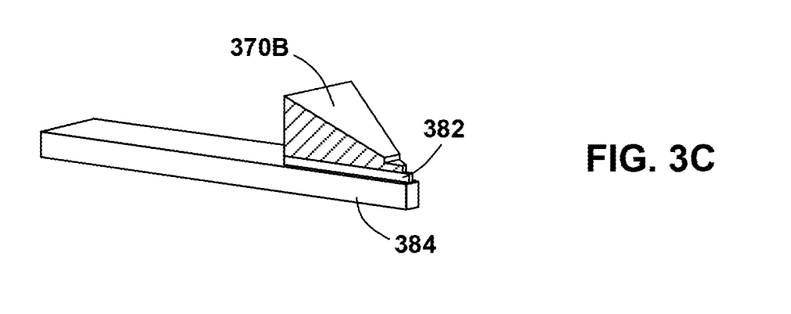

FIGS. 3A-3C schematically show cross-sectioned perspective views of the same portion of a magnetic writer as different components are removed (going from 3A to 3C) or added (going from 3C to 3A). The axes in the upper right show the orientation of the writer components with respect to the down-track (DT) direction (X-axis), the cross-track (CT) direction (Y-axis), and the direction of head-media spacing (Z-axis). In each of FIGS. 3A-3C, the components are cross-sectioned down the middle in the X-Z plane. FIG. 3A shows a write pole having a main part 354 that leads to a pole tip 352 that extends to the ABS. The trailing edge of a portion of the write pole is wrapped with an abutted heat channel 370A that may be made of Au or other heat conducting material. A write pole cap 374A is provided as a barrier layer between the write pole and the heat channel 370A, for example to prevent diffusion of gold or other materials from the heat channel into the magnetic write pole. The write pole cap 374A may be an insulator material or a metallic material. A heat sink disk 370B is disposed at the leading edge of the write pole and extending along the write pole tip 352 toward the ABS. A heat diffuser 372B is provided to carry and diffuse heat from the heat sink disk 370B. Heat diffuser 372B and heat sink disk 370B may be any material that conducts heat, such as Au. One or more diffusion layers may be provided between the write pole and the heat diffuser 372B and/or the heat sink 370B. Heat sink 370B is positioned between the write pole tip 352 and components of an NFT, such as waveguide 384 and plasmonic disk/peg 382.

As noted above, auxiliary wires or coils to provide current-generated MMF primarily to the write pole tip 352 can be provided near or around either or both of heat channel 370A or heat sink 370B. As one example, an auxiliary wire may follow the path of or be embedded in write pole cap 374A, or may follow the outer path of heat channel 370A, thus being routed around the sides and trailing edge of write pole tip 352. Similarly, an auxiliary wire may be provided at the leading edge of write pole tip 352 adjacent to heat sink 370B. In other examples, either or both of heat channel 370A and heat sink 370B may be used as auxiliary wires to provide current-generated MMF to the write pole tip 352. When heat sink 370B is used as an auxiliary wire, the heat diffuser 372B may be used for connection to electrical current, making use of how the heat diffuser extends out along the Y-axis with further distance from the ABS.

FIG. 3B shows the same writer shown in FIG. 3A after removing the heat channel 370A and the write pole cap 374A. FIG. 3C shows the same writer shown in FIG. 3B after removing the write pole (both the main part 354 and the pole tip 352) and the heat diffuser 372B.

Figure 4A:
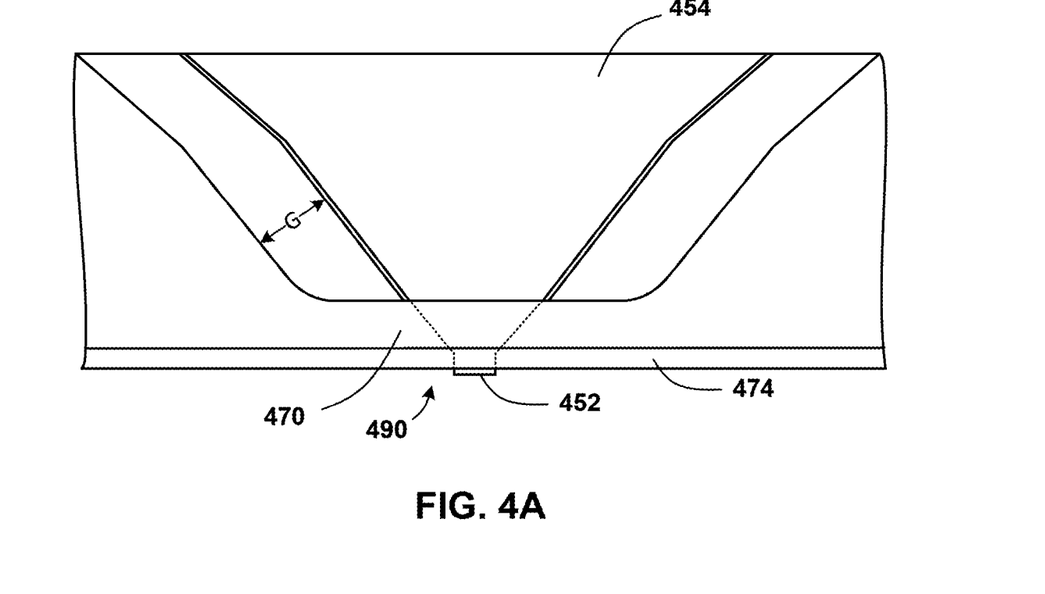
FIGS. 4A and 4B are schematic top and side views, respectively, of a write pole and abutted heat channel in accordance with aspects of the present disclosure.
Figure 4B:
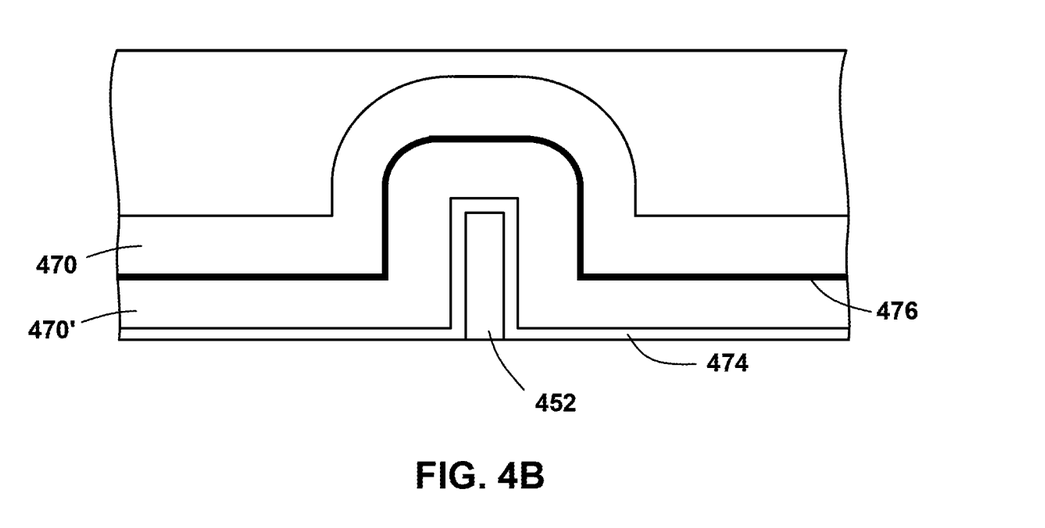

FIG. 4A shows a top view (from the trailing edge) of a portion of a writer, and FIG. 4B shows a front view (from the ABS) of a portion of the same writer. A main part of a write pole 454 narrows down to a write pole tip 452 at the ABS 490. An abutted heat channel 470 wraps around the sides and trailing edge of the write pole tip 452. The "wings" of the abutted heat channel 470 are separated by a gap G from the main part of the write pole 454. For example, the gap G may be a non-conductive layer having a thickness in a range of about 0.5 to 1 micron. A write pole cap 474 is disposed between the write pole tip 452 and the abutted heat channel 470, and may extend further toward the ABS 490 than the abutted heat channel 470. In the view shown in FIG. 4B, the heat channel 470 has a bi-layer construction including layers 470 and 470' separated by an insulating layer 476. Insulating layer 476 may be an aluminum oxide, silicon oxide, or other suitable insulating material. The inclusion of a non-conductive spacing between the heat channel and the write pole and/or the bi-layer heat channel structure having an insulating layer between are both ways to reduce current shunting from the heat channel to the write pole when the heat channel is used as an auxiliary wire.

Figure 5A:
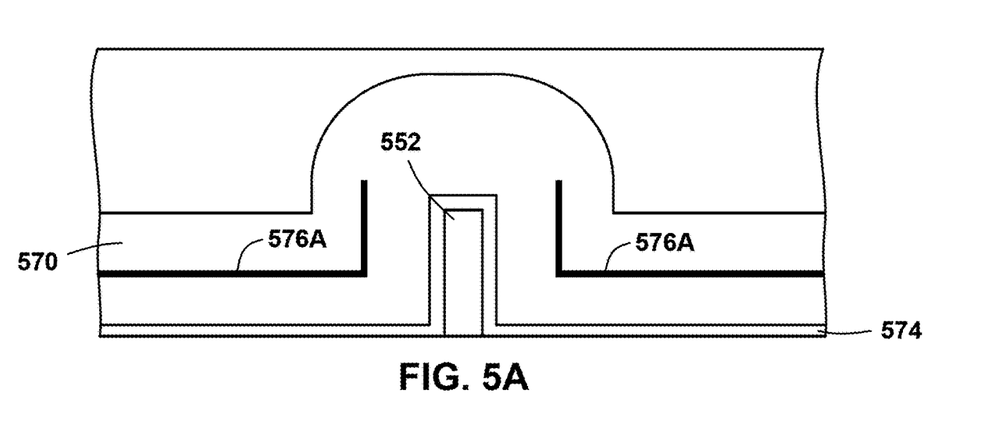
FIGS. 5A-5C are schematic views of a write pole and abutted heat channel having an insulating layer for directing current in accordance with aspects of the present disclosure.
Figure 5B:
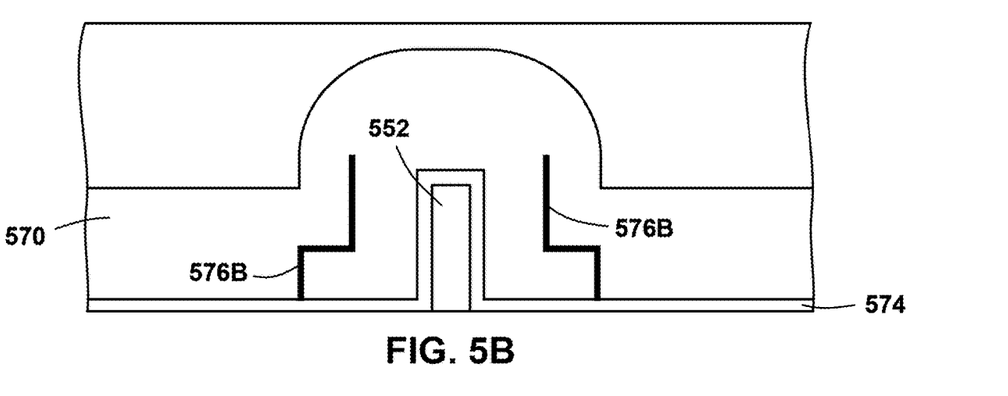
Figure 5C:
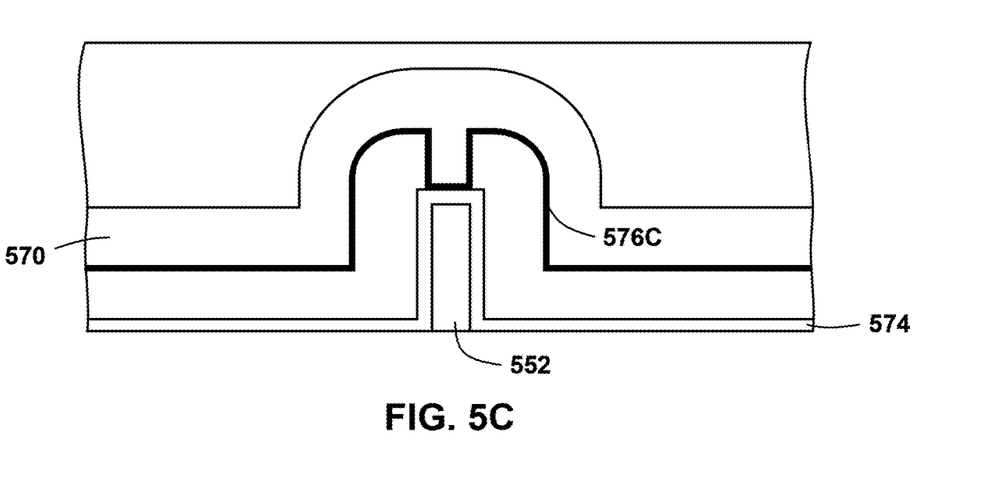

In certain embodiments in which a heat channel is utilized as the auxiliary wire, it may be desired to have only the portions of the heat channel that extend away from the pole tip electrically isolated from the current-carrying portions. As such, insulating layers provided within the heat channel may be routed differently than what is shown in FIG. 4B. Different examples are shown in FIGS. 5A-5C, each of which show a heat channel 570 routed around the sides and trailing edge of a pole tip 552 that is covered by a write pole cap 574. In FIG. 5A, the insulating layer 576A has a break over the trailing edge of the pole tip 552. In FIG. 5B, the insulating layer 576B has a similar break, and then truncates near the media-facing surface a short distance from the sides of the pole tip 552. In FIG. 5C, the insulating layer 576C has no discontinuities, but extends to the write pole cap 574 on the pole tip 552 at its trailing edge. These and other possible configurations may be used to allow the current to flow nearer to the pole tip.

Figure 6:
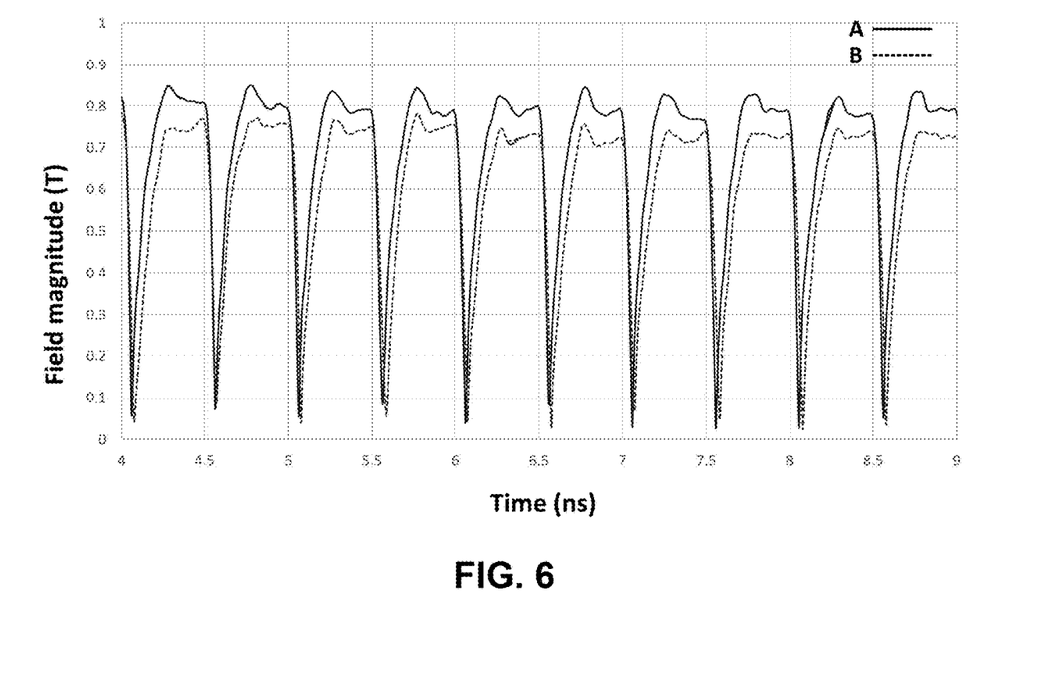
FIG. 6 shows time traces of modeled field magnitude rise times and amplitudes for recording head constructions with and without auxiliary wires.

Detailed micromagnetic modeling indicates that an auxiliary wire near the write pole tip and near the ABS improves the writer rise time, the writer field magnitude, and writer switching stability. FIG. 6 shows modeled time traces of the magnetic field magnitude 15 nm below the ABS of the writer pole tip and 35 nm in front of the pole tip for a writer with a two-turn main coil that is used to write bits that are 0.5 nsec long. In FIG. 6, the solid line time trace A represents a construction that includes an auxiliary wire near the ABS at the back edge of the pole tip, and the dashed line time trace B represents a construction without an auxiliary wire. The resulting traces indicate that the presence of the auxiliary wire provides faster switching (faster rise time on the traces), larger amplitude at higher frequencies (shorter bits), more repeatable peak field amplitude, and more stable switching.

Figure 7:
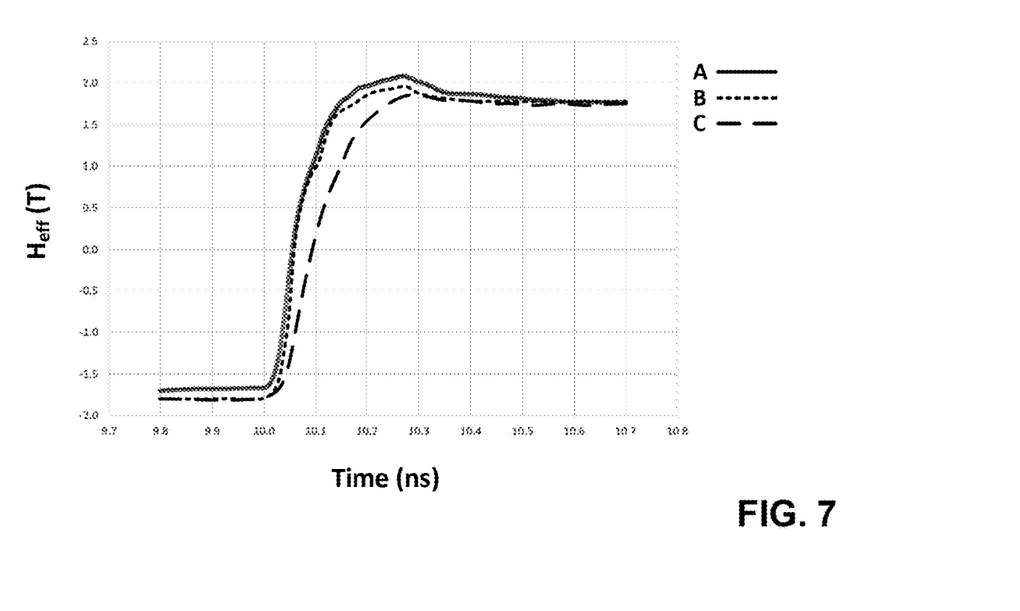
FIG. 7 shows time traces of modeled field magnitude rise times and amplitudes for recording head constructions with and without auxiliary wires.

FIG. 7 shows modeled time traces for three different writer constructions. The long-dashed trace C represents the field profile for a two-turn main coil writer without any auxiliary wires to drive the pole tip. The short-dashed trace B represents the field profile for a single-turn main coil writer having a single auxiliary wire located at the ABS near the back edge of the pole tip. The solid trace A represents the field profile for a single-turn main coil writer having an auxiliary wire located at the ABS near the back edge of the pole tip and using the Au heat sink located under the write pole as an additional auxiliary wire. FIG. 7 indicates that the constructions with one or two auxiliary wires exhibit reduced field rise time and larger, more stable fields at higher frequencies.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively"

and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A heat-assisted magnetic recording hard disk drive comprising:
    magnetic storage media;
    a recording head comprising a writer having a write pole comprising a pole tip configured to write on the magnetic data storage media, wherein the pole tip extends from a main part of the write pole toward a media-facing surface of the recording head;
    a main coil positioned and configured to deliver current-generated magneto-motive force primarily to the main part of the write pole;
    a near field transducer positioned proximate to the pole tip and configured to direct evanescent electromagnetic fields emanating from plasmon polaritons at the magnetic storage media;
    a heat channel disposed proximate to the pole tip and the near field transducer, the heat channel configured to conduct heat away from the pole tip and the near field transducer; and
    one or more auxiliary wires positioned and configured to deliver current-generated magneto-motive force primarily to the pole tip of the write pole.

2. The heat-assisted magnetic recording hard disk drive of claim 1, wherein the heat channel is configured to carry an electrical current to thereby function as one of the one or more auxiliary wires.

3. The heat-assisted magnetic recording hard disk drive of claim 1, wherein the heat channel is disposed at a trailing edge of the pole tip and partially wraps the pole tip near the media-facing surface.

4. The heat-assisted magnetic recording hard disk drive of claim 1, wherein the heat channel is a heat sink disposed at a leading edge of the pole tip.

5. The heat-assisted magnetic recording hard disk drive of claim 4, further comprising a heat diffuser that carries heat away from the heat sink.

6. The heat-assisted magnetic recording hard disk drive of claim 5, wherein the heat sink is configured to carry electrical current to thereby function as one of the one or more auxiliary wires, and electrical current is provided to the heat sink from connections on the heat diffuser.

7. The heat-assisted magnetic recording hard disk drive of claim 1, wherein the main coil comprises a single main coil located near a trailing edge of the write pole.

8. The heat-assisted magnetic recording hard disk drive of claim 7, wherein the single main coil is a single-turn coil.

9. The heat-assisted magnetic recording hard disk drive of claim 1, further comprising a write pole cap disposed between the heat channel and the pole tip.

10. A recording head for writing data on magnetic data storage media, the recording head comprising:
    a writer having a write pole comprising a pole tip configured to write on the magnetic data storage media, wherein the pole tip extends from a main part of the write pole toward a media-facing surface of the recording head;
    a main coil positioned and configured to deliver current-generated magneto-motive force primarily to the main part of the write pole; and
    one or more auxiliary wires positioned and configured to deliver current-generated magneto-motive force primarily to the pole tip of the write pole.

11. The recording head of claim 10, wherein the main coil is powered by a first electrical current and the one or more auxiliary wires are powered by a second electrical current that is different from the first electrical current.

12. The recording head of claim 11, wherein the first electrical current and the second electrical current are mutually out of phase.

13. The recording head of claim 10, wherein the main coil is powered by a first electrical current and the one or more auxiliary wires are also powered by the first electrical current.

14. The recording head of claim 10, further comprising a heat channel having a portion disposed near the pole tip to thereby conduct heat away from an area near the pole tip.

15. The recording head of claim 14, wherein the heat channel is configured to function as one of the one or more auxiliary wires.

16. The recording head of claim 14, wherein the recording head is configured to move in a down-track direction relative to the magnetic data storage media, thereby defining a front and a back of the recording head and components of the recording head, and the heat channel is positioned at the back of the write pole.

17. The recording head of claim 14, wherein the recording head is configured to move in a down-track direction relative to the magnetic data storage media, thereby defining a front and a back of the recording head and components of the recording head, and the heat channel is positioned at the front of the write pole.

18. The recording head of claim 14, wherein at least one of the one or more auxiliary wires is disposed adjacent to the portion of the heat channel disposed near the pole tip, the at least one of the one or more auxiliary wires being electrically isolated from at least those portions of the heat channel extending away from the pole tip.

19. The recording head of claim 14, further comprising a barrier layer disposed between the heat channel and the write pole.

20. The recording head of claim 11, further comprising an insulating layer disposed between the pole tip and the one or more auxiliary wires.

* * * * *